(12) United States Patent
Kim

(10) Patent No.: US 12,297,879 B2
(45) Date of Patent: May 13, 2025

(54) DISC BRAKE

(71) Applicant: HL MANDO CORPORATION, Pyeongtaek-si (KR)

(72) Inventor: Hongki Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 371 days.

(21) Appl. No.: 17/843,349

(22) Filed: Jun. 17, 2022

(65) Prior Publication Data

US 2022/0403900 A1  Dec. 22, 2022

(30) Foreign Application Priority Data

Jun. 22, 2021 (KR) .................. 10-2021-0080898

(51) Int. Cl.
| | |
|---|---|
| *F16D 65/095* | (2006.01) |
| *F16D 55/228* | (2006.01) |
| *F16D 65/00* | (2006.01) |
| *F16D 55/00* | (2006.01) |

(52) U.S. Cl.
CPC ......... *F16D 65/095* (2013.01); *F16D 55/228* (2013.01); *F16D 65/0068* (2013.01); *F16D 2055/0016* (2013.01); *F16D 2055/0091* (2013.01)

(58) Field of Classification Search
CPC .. F16D 65/095; F16D 65/0068; F16D 55/228; F16D 2055/0016; F16D 2055/0091
USPC ........................... 188/73.39–73.47
See application file for complete search history.

(56) References Cited

U.S. PATENT DOCUMENTS

| | | | | |
|---|---|---|---|---|
| 3,416,634 | A * | 12/1968 | Swift .................. | F16D 55/2265 188/73.44 |
| 4,577,731 | A * | 3/1986 | Burgdorf ............ | F16D 55/2265 188/73.34 |
| 6,315,087 | B1 * | 11/2001 | Bodin ..................... | B60T 1/065 188/73.45 |
| 9,353,810 | B2 * | 5/2016 | Morais ................ | F16D 65/0062 |
| 9,422,992 | B2 * | 8/2016 | Bach ................... | F16D 65/0975 |
| 11,746,842 | B2 * | 9/2023 | Baek .................... | F16D 65/0972 188/72.3 |
| 2011/0073418 | A1 * | 3/2011 | Kim .................... | F16D 65/0977 188/73.43 |
| 2011/0127122 | A1 * | 6/2011 | Suh ..................... | F16D 65/0977 188/72.4 |

FOREIGN PATENT DOCUMENTS

| | | | | |
|---|---|---|---|---|
| CN | 205533894 U | * | 8/2016 | ............. F16D 65/00 |
| EP | 3 559 496 B1 | | 8/2020 | |
| JP | 2010-48302 A | | 3/2010 | |
| KR | 10-2001-0103492 A | | 11/2001 | |
| KR | 10-2011-0125379 A | | 11/2011 | |
| KR | 10-2015-0128273 A | | 11/2015 | |

OTHER PUBLICATIONS

Korean Office Action issued on Dec. 16, 2022, in connection with the Korean Patent Application No. 10-2021-0080898, 10 pages.

* cited by examiner

*Primary Examiner* — Christopher P Schwartz
(74) *Attorney, Agent, or Firm* — Hauptman Ham, LLP

(57) ABSTRACT

A disc brake according to an embodiment of the present disclosure includes a cylinder body and a bracket assembly. The bracket assembly is disposed in a space in the cylinder body. The cylinder body and the bracket assembly are fastened to each other by fastening members.

18 Claims, 8 Drawing Sheets

DISC BRAKE

CROSS-REFERENCE TO RELATED APPLICATIONS

This application claims benefit and priority to Korean Patent Application No. 10-2021-0080898, filed on Jun. 22, 2021, with the Korean Intellectual Property Office, the disclosure of which is incorporated herein in its entirety by reference.

TECHNICAL FIELD

The present disclosure relates to a disc brake, and more particularly, to a disc brake, in which a bracket is separately applied to a fixed caliper, which makes it possible to simplify a process of manufacturing a cylinder body and reduce product costs.

BACKGROUND

Brake systems used for vehicles are classified into a drum brake and a disc brake. The drum brake produces friction between a brake drum and lining shoes by expanding lining shoes by using a wheel cylinder. The disc brake produces friction by operating a hydraulic cylinder to push pads from two opposite sides against a disc that rotates together with a wheel.

In the case of the disc brake, because a piston moves a short distance in a caliper, the piston has a large diameter, and the caliper has a large volume.

There are two types of calipers, a fixed caliper and a floating caliper. The fixed caliper is fixed to a knuckle. The floating caliper includes a fixed bracket and a cylinder. The bracket is fixed to a knuckle, and the cylinder is moved leftward and rightward by various types of sliding guides.

The fixed caliper uses a plurality of pistons, and the knuckle and the caliper are integrally assembled. Therefore, a braking force is dispersed to the caliper and the knuckle, and thus the caliper does not vibrate. In addition, brake performance is excellent because the plurality of pistons presses the disc. However, it is difficult to manufacture the disc brake, which increases manufacturing costs. Further, it is difficult to cool an outer cylinder, a countermeasure for coping with overheating is required. Further, there is a problem in that a length of a hub shaft increases.

FIG. 1 is a view illustrating a fixed caliper in the related art.

In general, when hydraulic pressure is applied, inner and outer pistons 1 and 2 of a fixed caliper move forward and push inner and outer pads 3 and 4, such that the inner and outer pads 3 and 4 squeeze a disc. In this case, a cylinder body 5 generates a braking force while supporting the pads.

To support the pads 3 and 4 in an upward/downward direction, a pad spring 7 and pins 8 are provided, and the pads 3 and 4 are guided by the pins 8 when the pads 3 and 4 move forward.

The pins 8 are fixed by clips 9 so that the pins 8 are prevented from separating from the cylinder body 5. A total of two pins 8 and a total of two clips 9 are used, one for each of two opposite left and right sides. The pad spring 7 is also fixed by the pins 8.

The integrated cylinder body 5 includes a space in which the pads 3 and 4 are mounted, holes in which the pistons are assembled, and an assembling part configured to be mounted on a vehicle. All the above-mentioned components are formed by machining the cylinder body 5.

A surface on which the pad spring 7 is seated needs to be formed straight in the cylinder body 5 in order to support the pads 3 and 4, and holes for fixing the pins 8 needs to be formed.

In the case of the disc brake including the fixed caliper in the related art having the above-mentioned features, all the structures for supporting the pads 3 and 4 are formed in the integrated structure of the cylinder body 5, which restricts a process of manufacturing the cylinder body 5. In addition, there is a problem in that all the integrated shapes of the cylinder body 5 need to be newly changed when the types of components to be mounted in the cylinder body 5 are changed.

DOCUMENT OF RELATED ART

Patent Document (Patent Document 1) European Patent No. 3559496 (published on Aug. 19, 2020)

SUMMARY

The present disclosure has been made in an effort to solve the above-mentioned problems, and an object of the present disclosure is to provide a disc brake, in which a separated structure is applied to a fixed caliper in the related art, which makes it possible to reduce product costs and simplify a process of manufacturing a cylinder body.

However, the object to be achieved by the present disclosure is not limited to the above-mentioned objects but may be variously expanded without departing from the spirit and scope of the present disclosure.

To achieve the object of the present disclosure, an exemplary embodiment of the present disclosure provides a disc brake, in which unlike a cylinder body of a fixed caliper in the related art, a cylinder body according to the present disclosure is not fixed to a knuckle of a vehicle body, and a separated bracket is applied and fixed to the knuckle, which makes it possible to eliminate restriction on a process of manufacturing the cylinder body.

The disc brake according to the embodiment of the present disclosure includes a cylinder body and a bracket assembly. The bracket assembly may be disposed in a space in the cylinder body. The cylinder body and the bracket assembly may be fastened to each other by fastening members.

According to the embodiment, the bracket assembly may include a bracket having a plurality of fastening holes. A plurality of fastening holes may be formed in a lateral surface of the cylinder body so that the bracket assembly is fastened to the cylinder body. One end of the fastening member may penetrate the fastening hole of the cylinder body and be inserted into and fixed to the fastening hole of the bracket.

According to the embodiment, the bracket may include: a support portion; a first seating portion connected to the support portion; a connection portion connected to the first seating portion; and a second seating portion connected to the connection portion.

According to the embodiment, fixing holes may be formed at two opposite ends of the support portion based on a longitudinal direction. Fastening means may fix the bracket to a vehicle body by being fastened to a knuckle of the vehicle body while penetrating the fixing holes.

According to the embodiment, the first seating portion may include first and second catching portions connected to the support portion. The first and second catching portions may extend from two opposite ends of the support portion, based on the longitudinal direction, in a direction vertically perpendicular to the longitudinal direction of the support portion. One pad structure may be seated between the first and second catching portions and configured to be movable forward or rearward.

According to the embodiment, a pad plate of one pad structure is configured to slide along first and second guide grooves respectively formed in the first and second catching portions.

According to the embodiment, the second seating portion may include third and fourth catching portions connected to the connection portion. The other pad structure may be seated between the third and fourth catching portions and configured to be movable forward or rearward.

According to the embodiment, a pad plate of the other pad structure may be configured to slide along third and fourth guide grooves respectively formed in the third and fourth catching portions.

According to the embodiment, the connection portion may include first and second connection portions connected to the first seating portion. One end of the first connection portion may be connected to the first catching portion, and one end of the second connection portion may be connected to the second catching portion. The first connection portion may extend from an end of the first catching portion in a direction horizontally perpendicular to a longitudinal direction of the support portion. The second connection portion may extend from an end of the second catching portion in the direction horizontally perpendicular to the longitudinal direction of the support portion.

According to the embodiment, one end of the third catching portion may be connected to the other end of the first connection portion, and one end of the fourth catching portion may be connected to the other end of the second connection portion. The third catching portion may extend downward from the other end of the first connection portion in a direction vertically perpendicular to a longitudinal direction of the support portion. The fourth catching portion may extend downward from the other end of the second connection portion in the direction vertically perpendicular to the longitudinal direction of the support portion.

According to the embodiment, one of the plurality of fastening holes may be provided at the other end of the third catching portion and formed in a direction horizontally perpendicular to the longitudinal direction of the support portion. Another of the plurality of fastening holes may be provided at the other end of the fourth catching portion and formed in the direction horizontally perpendicular to the longitudinal direction of the support portion.

According to the embodiment, the bracket assembly may include a pair of pad springs. Each of the pair of pad springs may include: an upper close-contact portion; and first and second extension portions respectively extending downward from two opposite sides of the upper close-contact portion. Each of the first and second extension portions sequentially may include: a coupling portion; a guide portion connected to the coupling portion; a lateral support portion connected to the guide portion and configured to support a lateral surface of a pad plate; and a lower end support portion connected to the lateral support portion and configured to support a lower end of the pad plate.

According to the embodiment, the guide portion of each of the first and second extension portions may be connected to a guide groove formed in a catching portion of a bracket and curved so that a protruding portion of the pad plate is fitted with the guide portion.

The disc brake according to the embodiment of the present disclosure adopts the separated structure in which the separate bracket is mounted on the fixed caliper. Therefore, it is possible to simplify the process of manufacturing the cylinder body and eliminate the restriction on the process of manufacturing the cylinder body.

Since the captive structure is applied to the bracket, it is possible to reduce the number of components and product costs.

However, the effect of the present disclosure is not limited to the above-mentioned effects but may be variously expanded without departing from the spirit and scope of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
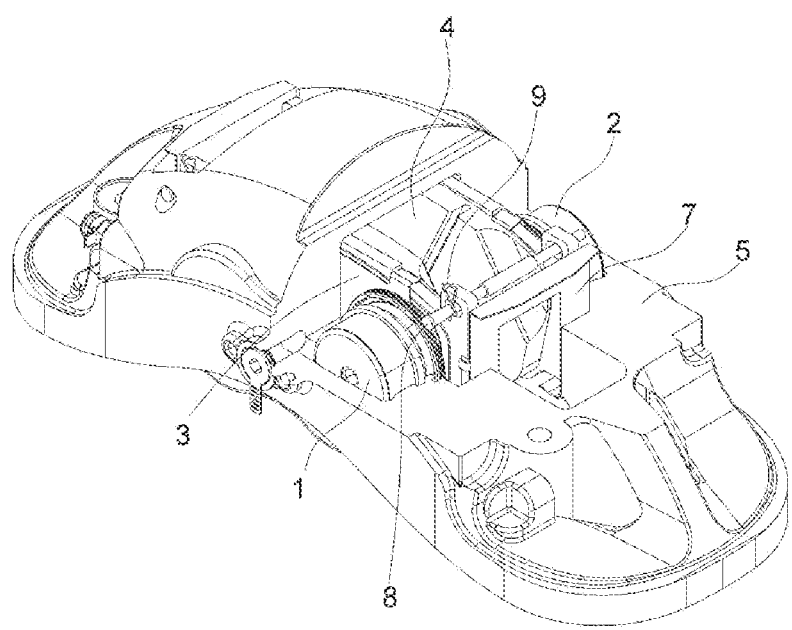
FIG. 1 is a view illustrating a fixed caliper in the related art.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in more detail with reference to the accompanying drawings. The specific description of constituent elements of the present disclosure will be omitted in order not to obscure the subject matter of the present disclosure if the constituent elements can be easily reproduced and clearly understand, from the related art, by those skilled in the art.

A thickness or a size of each constituent element illustrated in the drawings is exaggerated, omitted, or schematically illustrated for the purpose of clarity and for convenience of description. In addition, a size of each constituent element does not entirely reflect an actual size.

In general, a disc brake generates a frictional force by forcibly pressing pad plates having friction pads against two opposite surfaces of a disc that rotates together with a wheel of a vehicle. The generated frictional force stops a rotation of the disc, thereby braking the vehicle.

Hereinafter, a disc brake according to an embodiment of the present disclosure will be described.

Figure 2:
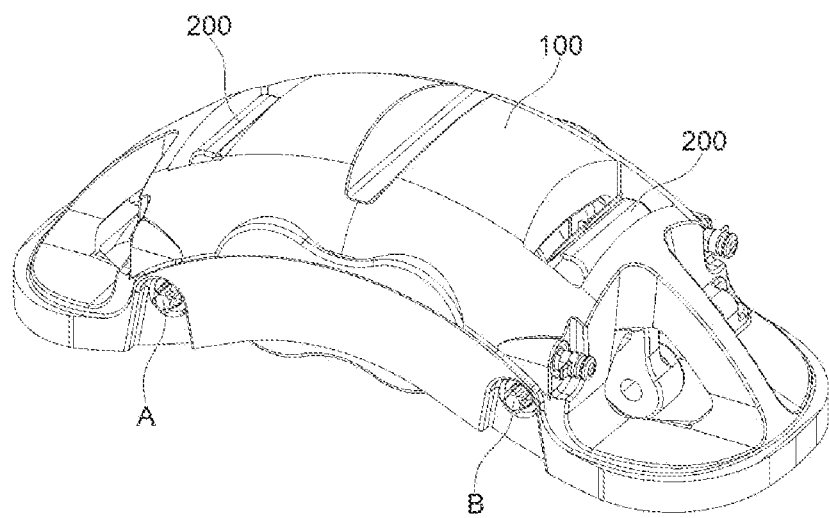
FIG. 2 is a perspective view illustrating a disc brake according to an embodiment of the present disclosure.
Figure 3:
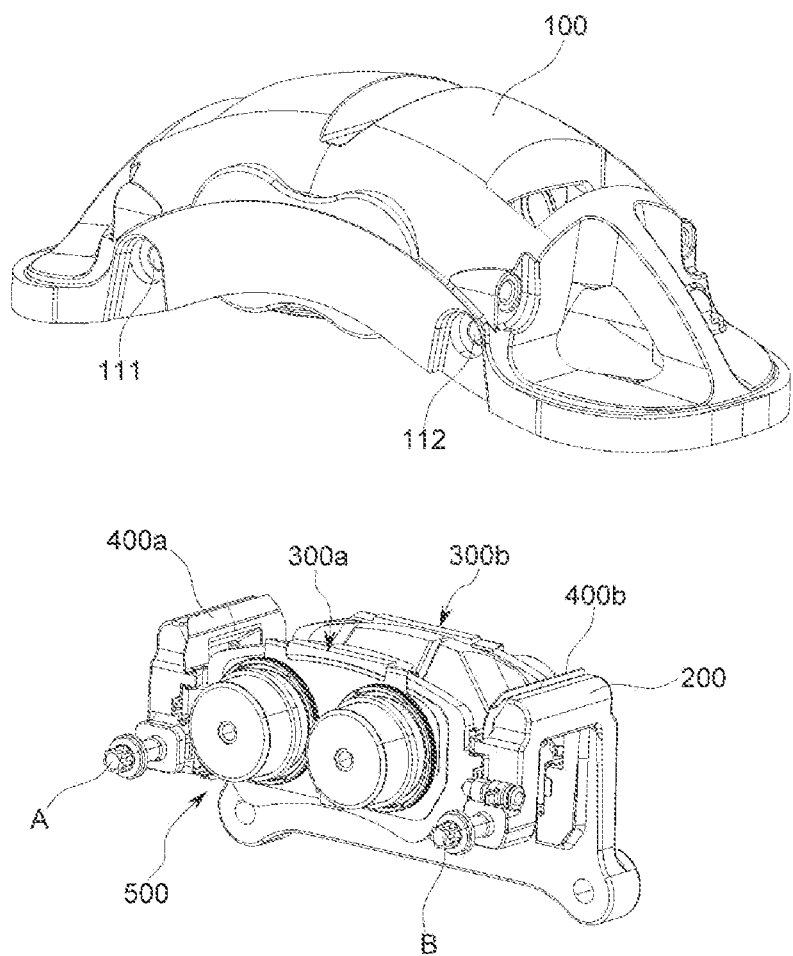
FIG. 3 is a perspective view illustrating a cylinder body and a bracket assembly of the disc brake illustrated in FIG. 2.
Figure 4:
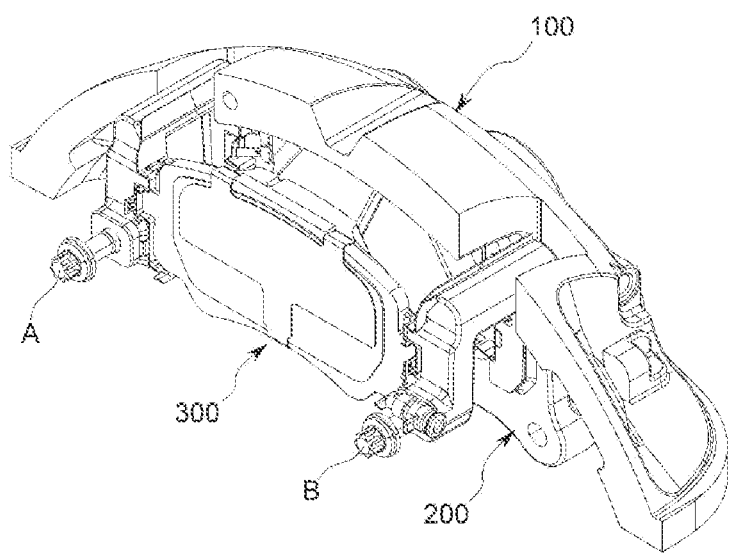
FIG. 4 is a cross-sectional view illustrating the cylinder body and a state in which the bracket assembly is disposed in the cylinder body illustrated in FIG. 3.
Figure 5:
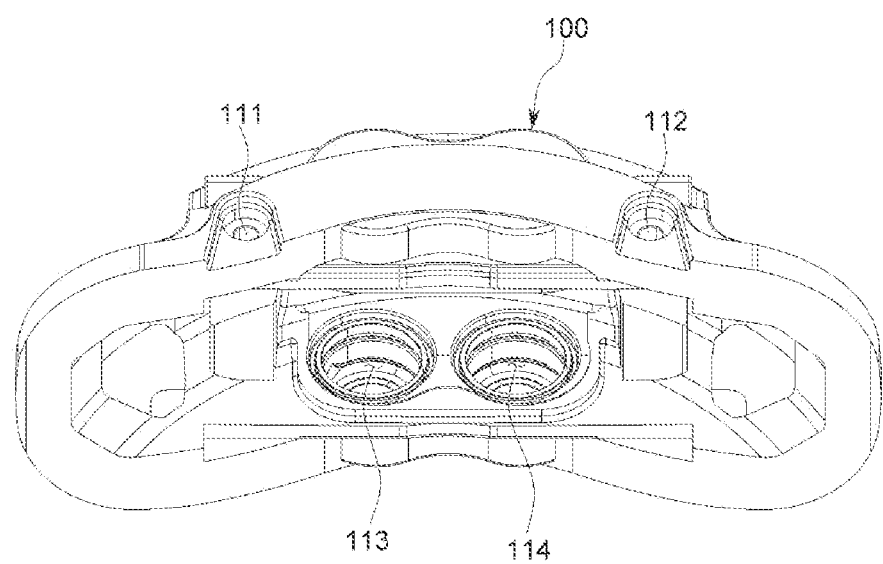
FIG. 5 is a perspective view of the cylinder body illustrated in FIG. 3 when viewed from below.

FIG. 2 is a perspective view illustrating a disc brake according to an embodiment of the present disclosure. FIG. 3 is a perspective view illustrating a cylinder body and a bracket assembly of the disc brake illustrated in FIG. 2. FIG. 4 is a view illustrating a state in which the bracket assembly is disposed in the cylinder body illustrated in FIG. 3. FIG. 4 illustrates a cross-section of the cylinder body. FIG. 5 is a perspective view of the cylinder body illustrated in FIG. 3 when viewed from below.

Referring to FIGS. 1 to 5, the disc brake according to the embodiment of the present disclosure includes a cylinder body 100 and a bracket assembly.

<Cylinder Body 100>

The cylinder body 100 includes a space configured to accommodate the bracket assembly. That is, the bracket assembly is disposed in the space in the cylinder body 100.

A plurality of fastening holes 111 and 112 is formed in a lateral surface of the cylinder body 100 so that the bracket assembly is fastened to the cylinder body 100. The fastening holes 111 and 112 are through-holes formed through a sidewall of the cylinder body 100.

The fastening holes 111 and 112 formed in the lateral surface of the cylinder body 100 are formed at positions corresponding to positions of fastening holes 265 and 275 (see FIG. 7) formed in a bracket 200 to be described below in the state in which the bracket assembly is disposed in the space in the cylinder body 100.

According to the embodiment of the present disclosure, a plurality of fastening holes is further formed in one side surface and the other side surface of the cylinder body 100 so that the bracket assembly is fastened to the cylinder body 100. In the embodiment, a fastening hole may be additionally formed in the bracket 200. Specifically, fastening holes may be additionally formed on one side surface of a first catching portion 220 and one side surface of a second catching portion 230 (see FIG. 7) of the bracket 200.

The cylinder body 100 is fastened to the bracket 200 of the bracket assembly by means of fastening members A and B.

Screw threads may be formed on one side of each of the fastening members A and B, and screw threads may be formed in the fastening holes 265 and 275 of the bracket 200. The fastening members A and B may be bolts.

The ends of the fastening members A and B penetrate the fastening holes 111 and 112 of the cylinder body 100 and are inserted into and fixed to the fastening holes 265 and 275 of the bracket 200.

The space of the cylinder body 100 accommodates the bracket assembly. One or more cylinder grooves 113 and 114 are formed in an inner surface of the cylinder body 100 that defines the space, and the cylinder grooves 113 and 114 accommodate piston assemblies 500 of the bracket assembly.

The cylinder grooves 113 and 114 are respectively formed in one inner surface of the cylinder body 100 and another inner surface that faces one inner surface. One or more cylinder grooves 113 and 114 may be formed.

FIG. 5 illustrates that two cylinder grooves 113 and 114 are formed in one inner surface of the cylinder body 100, and two cylinder grooves 113 and 114 are formed in another inner surface that faces one inner surface. However, the present disclosure is not limited thereto, and one or two or more cylinder grooves may be formed.

The piston assemblies 500 of the bracket assembly are respectively disposed in the plurality of cylinder grooves 113 and 114.

The cylinder body 100 of the disc brake according to the embodiment of the present disclosure may be a cylinder body 100 of a fixed caliper.

A fixed caliper in the related art needs to have a pin for guiding a pad, a pin fixing hole formed in a cylinder body to fix the pin, and a pin fixing clip provided to prevent the pin from separating from the cylinder body.

However, the disc brake according to the embodiment of the present disclosure does not require a pin, and thus the disc brake does not require a pin fixing clip. It is not necessary to form a pin fixing hole in the cylinder body 100.

Unlike the cylinder body of the fixed caliper in the related art, the cylinder body 100 of the disc brake according to the embodiment of the present disclosure is not fixed to a knuckle (not illustrated) of a vehicle body, but the bracket assembly (specifically, the bracket 200) is fixed to the knuckle.

<Bracket Assembly>

Figure 6:
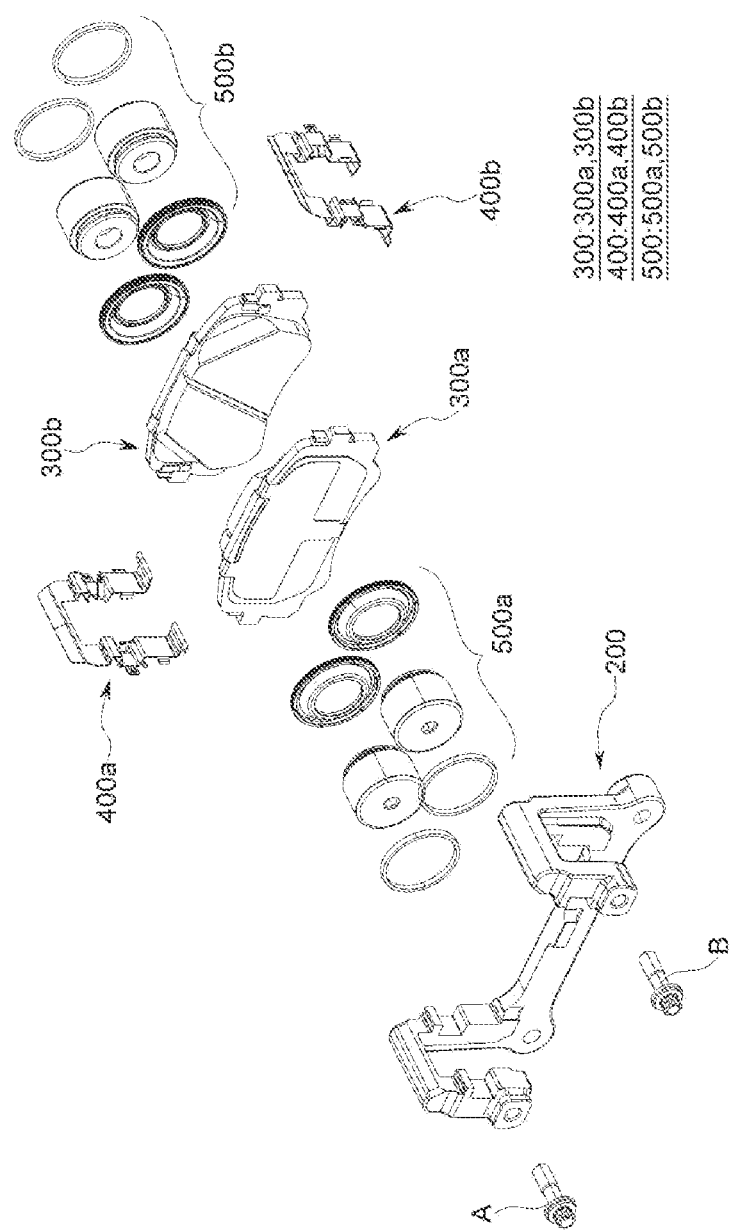
FIG. 6 is an exploded perspective view of the bracket assembly illustrated in FIG. 3.

FIG. 6 is an exploded perspective view of the bracket assembly illustrated in FIG. 3.

Referring to FIG. 6, the bracket assembly includes the bracket 200, pad structures 300, pad springs 400, and piston assemblies 500.

The bracket assembly is disposed in the space in the cylinder body 100 and fastened to the cylinder body 100. Specifically, the bracket 200 of the bracket assembly is fastened to the cylinder body 100 by the fastening members A and B.

<Bracket 200>

Figure 7:
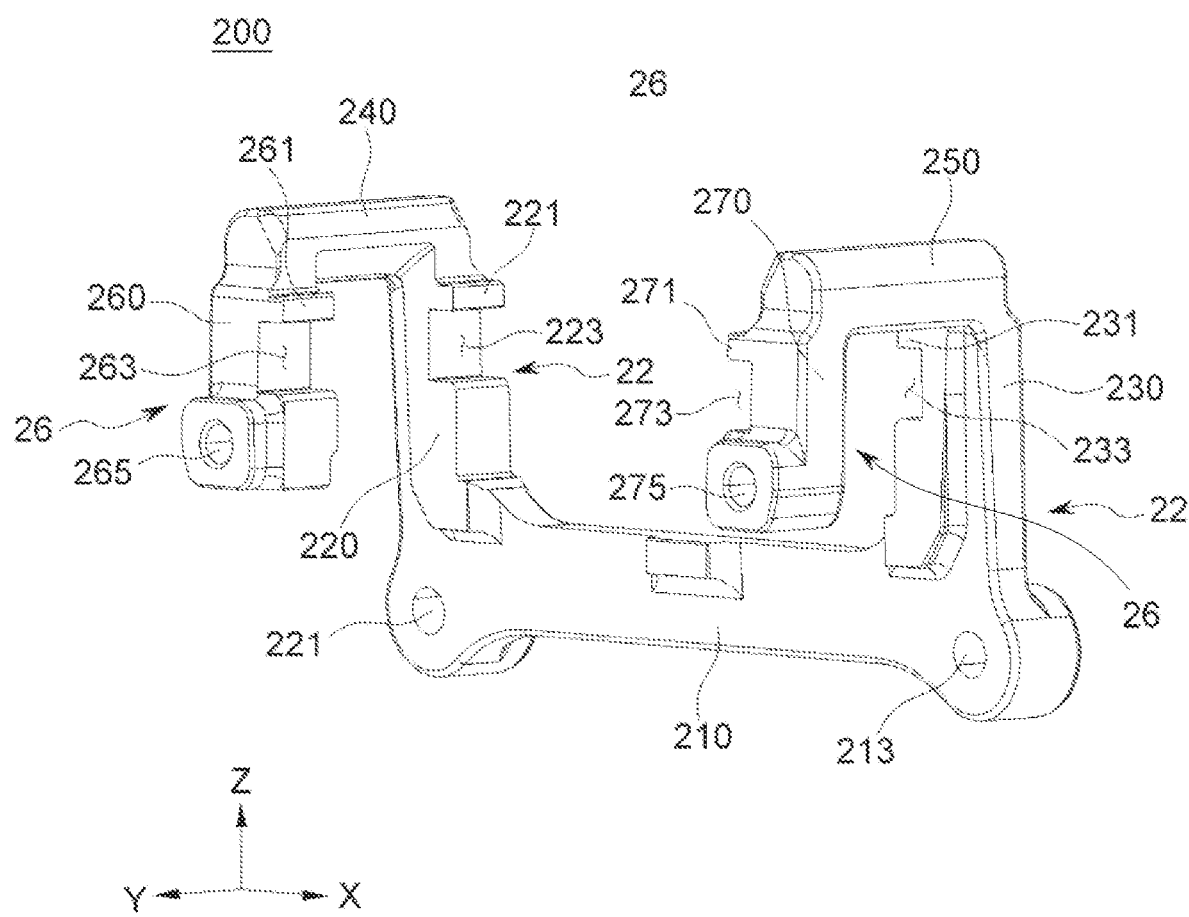
FIG. 7 is a perspective view illustrating a bracket illustrated in FIG. 6.

FIG. 7 is a perspective view illustrating the bracket illustrated in FIG. 6.

Referring to FIGS. 2 to 7, the pair of pad structures 300 and the pair of pad springs 400 are seated on the bracket 200. The pair of pad structures 300 moves forward or rearward in the state in which the pair of pad structures 300 is seated on the bracket 200.

The bracket 200 includes a support portion 210, a first seating portion 22 connected to the support portion 210, a connection portion connected to the first seating portion 22, and a second seating portion 26 connected to the connection portion. The support portion 210, the first seating portion 22, the connection portion, and the second seating portion 26 are integrated.

The support portion 210 has a rod shape having a predetermined length.

Fixing holes 211 and 213 are formed at two opposite ends of the support portion 210 based on a longitudinal direction. The fixing holes 211 and 213 may be formed in a direction horizontally perpendicular to the longitudinal direction. In this case, the longitudinal direction of the support portion 210 may be an X-axis direction in FIG. 7. The direction horizontally perpendicular to the longitudinal direction (X-axis direction) may be a Y-axis direction in FIG. 7. Further, a direction vertically perpendicular to the longitudinal direction (X-axis direction) of the support portion 210 may be a Z-axis direction in FIG. 7.

The support portion 210 is connected to the knuckle of the vehicle body and fixed to the vehicle body. Specifically, fastening means (not illustrated) penetrate the fixing holes 211 and 213 formed in the support portion 210 and are fastened to the knuckle of the vehicle body. Therefore, the bracket 200 is fixed to the vehicle body by being fastened to the knuckle of the vehicle body by means of the fastening means.

The first seating portion 22 is connected to the support portion 210, and one pad structure 300b is seated on the first seating portion 22.

The pad structure 300b may move (forward or rearward) in the state in which the pad structure 300b is seated on the first seating portion 22. Specifically, the pad structure 300b moves forward or rearward in the Y-axis direction in the state in which the pad structure 300b is seated on the first seating portion 22.

The first seating portion 22 includes the first catching portion 220 and the second catching portion 230 connected to the support portion 210. One pad structure 300b is seated between the first catching portion 220 and the second catching portion 230.

The first catching portion 220 and the second catching portion 230 may each have a rod shape having a predetermined length. The first catching portion 220 and the second catching portion 230 extend from the two opposite ends of the support portion 210 in the direction (Z-axis direction) vertically perpendicular to the longitudinal direction (X-axis direction) of the support portion 210.

The first catching portion 220 includes a first guide groove 223 having a concave groove shape, and a first guide projection 221 stepped with respect to the first guide groove 223.

Any one 330 of the protruding portions 330 and 340 (see FIG. 8) respectively formed at two opposite ends of the pad plate 310, which will be described below, is seated in the first guide groove 223. The protruding portion 330 moves forward or rearward in the Y-axis direction in the first guide groove 223.

A shape of the first guide groove 223 corresponds to a shape of the protruding portion 330 formed at the end of the pad plate 310.

The first guide projection 221 prevent the pad structure 300 from moving in the Z-axis direction in the state in which the pad structure 300 is seated on the first seating portion 22.

The second catching portion 230 includes a second guide groove 233 having a concave groove shape, and a second guide projection 231 stepped with respect to the second guide groove 233.

The second guide groove 233 and the second guide projection 231 of the second catching portion 230 respectively face the first guide groove 223 and the first guide projection 221 of the first catching portion 220.

The other 340 of the protruding portions 330 and 340 (see FIG. 8) respectively formed at the two opposite ends of the pad plate 310 may be seated in the second guide groove 233, and the protruding portion 340 may move (forward or rearward) in the Y-axis direction in the second guide groove 233.

A shape of the second guide groove 233 may correspond to a shape of the protruding portion 340 formed at the end of the pad plate 310.

The second guide projection 231 prevents the pad structure 300 from moving in the Z-axis direction in the state in which the pad structure 300 is seated on the first seating portion 22.

The connection portion is connected to the first seating portion 22.

The connection portion includes a first connection portion 240 and a second connection portion 250 connected to the first seating portion 22. Specifically, one end of the first connection portion 240 is connected to the first catching portion 220 of the first seating portion 22, and one end of the second connection portion 250 is connected to the second catching portion 230 of the first seating portion 22.

The first connection portion 240 and the second connection portion 250 each have a rod shape having a predetermined length.

The first connection portion 240 extends from the end of the first catching portion 220 in the direction (Y-axis direction) horizontally perpendicular to the longitudinal direction (X-axis direction) of the support portion 210.

The second connection portion 250 extends from the end of the second catching portion 230 in the direction (Y-axis direction) horizontally perpendicular to the longitudinal direction (X-axis direction) of the support portion 210.

The pair of pad structures 300 is disposed to be spaced apart from each other by the first connection portion 240 and the second connection portion 250.

The second seating portion 26 is connected to the connection portion, and the other pad structure 300a is seated on the second seating portion 26.

The pad structure 300a moves forward or rearward in the state in which the pad structure 300a is seated on the second seating portion 26. Specifically, the pad structure 300a moves forward or rearward in the Y-axis direction in the state in which the pad structure 300a is seated on the second seating portion 26.

The second seating portion 26 includes a third catching portion 260 and a fourth catching portion 270 connected to the connection portion. Specifically, one end of the third catching portion 260 is connected to the other end of the first connection portion 240, and one end of the fourth catching portion 270 is connected to the other end of the second connection portion 250. The other pad structure 300a is seated between the third catching portion 260 and the fourth catching portion 270.

The third catching portion 260 and the fourth catching portion 270 each have a rod shape having a predetermined length.

The third catching portion 260 extends downward from the other end of the first connection portion 240 in the direction (Z-axis direction) vertically perpendicular to the longitudinal direction (X-axis direction) of the support portion 210.

The fourth catching portion 270 extends downward from the other end of the second connection portion 250 in the direction (Z-axis direction) vertically perpendicular to the longitudinal direction (X-axis direction) of the support portion 210.

The third catching portion 260 includes a third guide groove 263 having a concave groove shape, a third guide projection 261 formed above the third guide groove 263 and stepped with respect to the third guide groove 263, and the fastening hole 265 formed below the third guide groove 263 (at the other end of the third catching portion 260).

Any one protruding portion 340 of the protruding portions 330 and 340 (see FIG. 8) respectively formed at the two opposite ends of the pad plate 310 is seated in the third guide groove 263, and the protruding portion 340 moves forward or rearward in the Y-axis direction in the third guide groove 263.

A shape of the third guide groove 263 corresponds to the shape of the protruding portion 340 formed at the end of the pad plate 310.

The third guide projection 261 prevents the pad structure 300a from moving in the Z-axis direction in the state in which the pad structure 300a is seated on the second seating portion 26.

The fastening hole 265 is provided at the other end of the third catching portion 260 and formed in the direction (Y-axis direction) horizontally perpendicular to the longitudinal direction (X-axis direction) of the support portion 210. The direction of the fastening hole 265 is identical to the direction of the fixing holes 211 and 213 formed in the support portion 210.

A screw thread is formed in the fastening hole 265. One end of the fastening member A is inserted into and fixed to the fastening hole 265.

The fourth catching portion 270 includes a fourth guide groove 273 having a concave groove shape, a fourth guide projection 271 formed above the fourth guide groove 273 and stepped with respect to the fourth guide groove 273, and the fastening hole 275 formed below the fourth guide groove 273 (at the other end of the fourth catching portion 270).

The fourth guide groove 273 and the fourth guide projection 271 of the fourth catching portion 270 respectively face the third guide groove 263 and the third guide projection 261 of the third catching portion 260.

The other 330 of the protruding portions 330 and 340 (see FIG. 8) respectively formed at the two opposite ends of the pad plate 310 is seated in the fourth guide groove 273, and the protruding portion 330 moves forward or rearward in the Y-axis direction in the fourth guide groove 273.

A shape of the fourth guide groove 273 corresponds to the shape of the protruding portion 330 formed at the end of the pad plate 310.

The fourth guide projection 271 prevents the pad structure 300a from moving in the Z-axis direction in the state in which the pad structure 300a is seated on the second seating portion 26.

The fastening hole 275 provided at the other end of the fourth catching portion 270 and formed in the direction (Y-axis direction) horizontally perpendicular to the longitudinal direction (X-axis direction) of the support portion 210. The direction of the fastening hole 275 is identical to the direction of the fixing holes 211 and 213 formed in the support portion 210.

A screw thread may be formed in the fastening hole 275. One end of the fastening member B is inserted into and fixed to the fastening hole 275.

The bracket 200 of the disc brake according to the embodiment of the present disclosure will be briefly described below.

The support portion 210 of the bracket 200 is fixed to the vehicle body by being connected to the knuckle of the vehicle body by the fastening means (not illustrated).

The plurality of fastening holes 265 and 275 is formed in the bracket. The fastening members A and B penetrate the fastening holes 111 and 112 of the cylinder body 100 and are inserted into and fixed to the fastening holes 265 and 275 respectively formed in the third catching portion 260 and the fourth catching portion 270 of the second seating portion 26 of the bracket 200. The second seating portion 26 of the bracket 200 is fixed to the cylinder body 100 by the fastening members A and B.

The pad structures 300 are respectively seated on the first seating portion 22 and the second seating portion 26 of the bracket 200. That is, any one pad structure 300b of the pair of pad structures 300a and 300b is seated on the first seating portion 22, and the other pad structure 300a of the pair of pad structures 300a and 300b is seated on the second seating portion 26. The disc (not illustrated), which rotates together with a wheel (not illustrated), is disposed between the pair of pad structures 300.

The connection portion of the bracket 200 allows the pair of pad structures 300 to be spaced apart from each other at a predetermined interval.

<Pad Structure 300>

Figure 8:
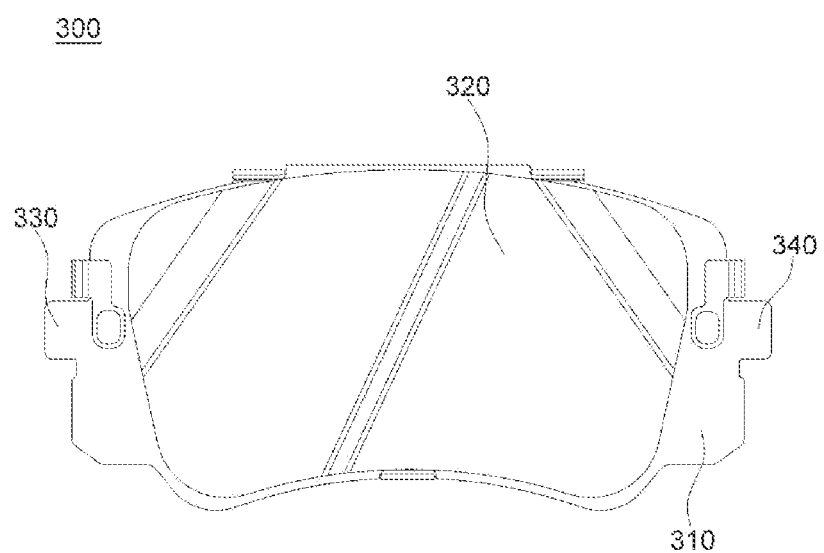
FIG. 8 is a view illustrating a pad structure illustrated in FIG. 6.

FIG. 8 is a view illustrating the pad structure illustrated in FIG. 6.

Referring to FIGS. 2 to 8, the pad structure 300 includes a pad plate 310, and a friction pad 320 attached to one side surface of the pad plate 310.

The protruding portions 330 and 340 are formed at the two opposite ends of the pad plate 310.

The pair of pad structures 300 is provided.

The pair of pad structures 300 is seated on the bracket 200 so as to be movable forward or rearward and spaced apart from each other at a predetermined interval. Specifically, the pair of pad structures 300 is spaced apart from each other at a predetermined interval by the connection portion.

The disc, which rotates together with the wheel, is positioned between the pair of pad structures 300. The pair of pad structures 300 generates a braking force by being pressed by the piston assemblies 500 against the two opposite surfaces of the disc. Specifically, the friction pads 320 of the pad structures 300 are brought into close contact with and pressed against the two opposite surfaces of the disc by pistons of the piston assemblies 500, thereby generating the braking force.

The pad plate 310 of any one pad structure 300b of the pair of pad structures 300 slides along the first and second guide grooves 223 and 233 formed in the first and second catching portions 220 and 230 of the bracket 200. To this end, the protruding portions 330 and 340 formed at the two opposite ends of the pad plate 310 are respectively coupled to and fitted into the first and second guide grooves 223 and 233.

The pad plate 310 of the other pad structure 300a of the pair of pad structures 300 slides along the third and fourth guide grooves 263 and 273 formed in the third and fourth catching portions 260 and 270 of the bracket 200. To this end, the protruding portions 330 and 340 formed at the two opposite ends of the pad plate 310 are respectively coupled to and fitted into the third and fourth guide grooves 263 and 273.

When the pad plates 310 move (forward) along the guide grooves 223, 233, 263, and 273 of the bracket 200, the friction pads 320 respectively come into close contact with the two opposite surfaces of the disc, thereby generating the braking force.

<Pad Spring 400>

Figure 9:
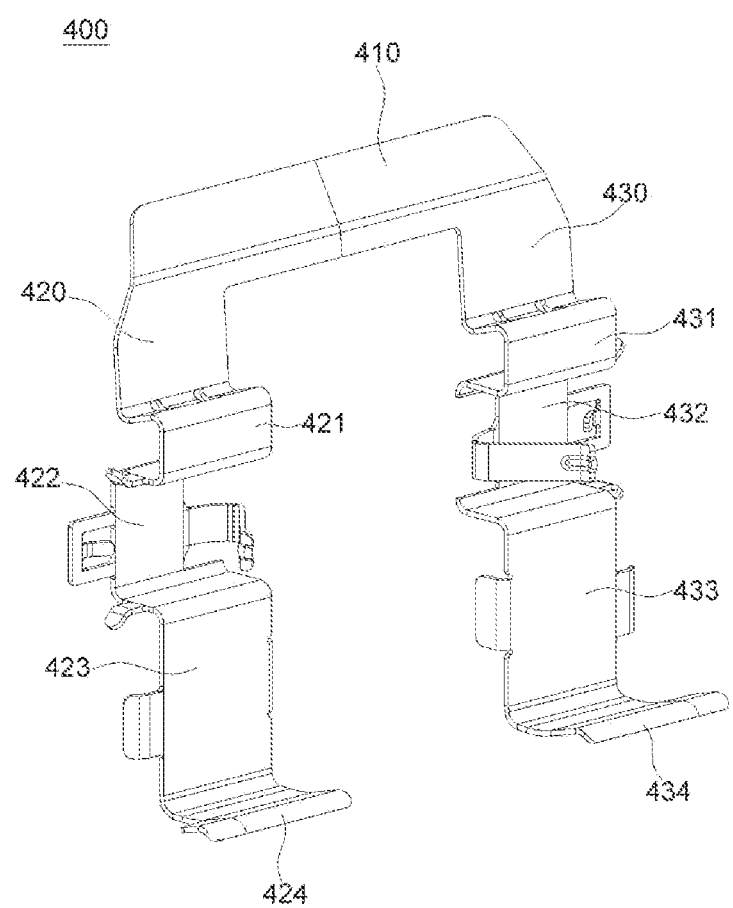
FIG. 9 is a perspective view illustrating a pad spring illustrated in FIG. 6.

FIG. 9 is a perspective view illustrating the pad spring illustrated in FIG. 6.

Referring to FIGS. 2 to 9, the pair of pad springs 400 is disposed on the bracket 200 and supports the pair of pad structures 300 so that the pair of pad structures 300 slides. Specifically, each of the pair of pad springs 400 is disposed between the bracket 200 and the pad structure 300 and supports the pad structure 300 so that the pad structure 300 slides. The pad spring 400 returns the pad structure 300 having slid to an original position.

Each of the pair of pad springs 400 includes an upper close-contact portion 410, and first and second extension portions 420 and 430 respectively extending downward from two opposite sides of the upper close-contact portion 410. The first and second extension portions 420 and 430 are spaced apart from each other at a predetermined distance.

The upper close-contact portion 410, the first extension portion 420, and the second extension portion 430 are integrated.

The upper close-contact portion 410 is in close contact with the connection portion 240 or 250 of the bracket 200. The upper close-contact portion 410 is bent outward toward the connection portion 240 or 250 of the bracket 200.

The first extension portion 420 includes a coupling portion 421, a guide portion 422 connected to the coupling portion 421, a lateral support portion 423 connected to the guide portion 422 and configured to support a lateral surface of the pad plate 310, and a lower end support portion 424 connected to the lateral support portion 423 and configured to support a lower end of the pad plate 310. The coupling portion 421, the guide portion 422, the lateral support portion 423, and the lower end support portion 424 are formed by bending a single member multiple times.

The second extension portion 430 includes a coupling portion 431, a guide portion 432 connected to the coupling portion 431, a lateral support portion 433 connected to the guide portion 432 and configured to support the lateral surface of the pad plate 310, and a lower end support portion 434 connected to the lateral support portion 433 and configured to support the lower end of the pad plate 310. The coupling portion 431, the guide portion 432, the lateral support portion 433, and the lower end support portion 434 are formed by bending a single member multiple times.

The coupling portions 421 and 431, the guide portions 422 and 432, the lateral support portions 423 and 433, and the lower end support portions 424 and 434, which constitute the first and second extension portions 420 and 430, are symmetrically formed.

An arrangement position and a coupling relationship of any one pad spring 400a of the pair of pad springs 400a and 400b will be described below.

The upper close-contact portion 410 is in close contact with the first connection portion 240 of the bracket 200. The upper close-contact portion 410 is bent outward toward the first connection portion 240 of the bracket 200.

The coupling portion 421 of the first extension portion 420 is coupled to the third guide projection 261 of the third catching portion 260 constituting the bracket 200 and curved so that the third guide projection 261 is fitted with the coupling portion 421. The coupling portion 431 of the second extension portion 430 is coupled to the first guide projection 221 of the first catching portion 220 constituting the bracket 200 and curved so that the first guide projection 221 is fitted with the coupling portion 431. The coupling portions 421 and 431 each have a shape corresponding to each of the guide projections 261 and 221.

The guide portion 422 of the first extension portion 420 is coupled to the third guide groove 263 formed in the third catching portion 260 of the bracket 200 and curved so that the protruding portion 340 of the pad plate 310 is fitted with the guide portion 422. The guide portion 432 of the second extension portion 430 is coupled to the first guide groove 223 formed in the first catching portion 220 of the bracket 200 and curved so that the protruding portion 330 of the pad plate 310 is fitted with the guide portion 432.

The lateral support portion 423 of the first extension portion 420 supports a lower portion of the protruding portion 340 and the lateral surface of the pad plate 310. The lower end support portion 424 is bent in a direction perpendicular to the lateral support portion 423 and supports the lower end of the pad plate 310. The lateral support portion 433 of the second extension portion 430 supports a lower portion of the protruding portion 330 and the lateral surface of the pad plate 310. The lower end support portion 434 is bent in a direction perpendicular to the lateral support portion 433 and supports the lower end of the pad plate 310.

An arrangement position and a coupling relationship of the other pad spring 400b of the pair of pad springs 400a and 400b will be described below.

The upper close-contact portion 410 is in close contact with the second connection portion 250 of the bracket 200. The upper close-contact portion 410 is bent outward toward the second connection portion 250 of the bracket 200.

The coupling portion 421 of the first extension portion 420 is coupled to the second guide projection 231 of the second catching portion 230 constituting the bracket 200 and curved so that the second guide projection 231 is fitted with the coupling portion 421. The coupling portion 431 of the second extension portion 430 is coupled to the fourth guide projection 271 of the fourth catching portion 270 constituting the bracket 200 and curved so that the fourth guide projection 271 is fitted with the coupling portion 431. The coupling portions 421 and 431 each have a shape corresponding to each of the guide projections 231 and 271.

The guide portion 422 of the first extension portion 420 is coupled to the second guide groove 223 formed in the second catching portion 230 constituting the bracket 200 and curved so that the protruding portion 340 of the pad plate 310 is fitted with the guide portion 422. The guide portion 432 of the second extension portion 430 is coupled to the fourth guide groove 273 formed in the fourth catching portion 270 constituting the bracket 200 and curved so that the protruding portion 330 of the pad plate 310 is fitted with the guide portion 432.

The lateral support portion 423 of the first extension portion 420 supports a lower portion of the protruding portion 340 and the lateral surface of the pad plate 310. The lower end support portion 424 is bent in a direction perpendicular to the lateral support portion 423 and supports the lower end of the pad plate 310. The lateral support portion 433 of the second extension portion 430 supports a lower portion of the protruding portion 330 and the lateral surface of the pad plate 310. The lower end support portion 434 is bent in a direction perpendicular to the lateral support portion 433 and supports the lower end of the pad plate 310.

The pair of pad springs 400 allows the pair of pad plates 300 to smoothly move.

<Piston Assembly 500>

The piston assemblies 500 each include the piston, a piston seal, a piston boot, and a boot ring and are disposed in the cylinder grooves 113 and 114 of the cylinder body 100.

The piston is moved forward or rearward by hydraulic braking pressure.

The piston seal is disposed between an inner peripheral surface of the cylinder groove 113 or 114 and an outer peripheral surface of the piston and maintains sealability between the cylinder groove and the piston.

The piston boot seals a portion between the piston and the cylinder body 100 to prevent foreign substances from entering the piston. In general, the piston boot is made of rubber and installed at a tip of the piston. The boot ring is inserted into the piston boot.

The piston disposed in each of the cylinder grooves 113 and 114 of the cylinder body 100 may move forward or rearward. When the hydraulic pressure is applied to the cylinder grooves 113 and 114, the pistons move forward and press the pad plates 310 of the adjacent pad structures 300 against the disc. The friction pad 320 attached to the pad plate 310 comes into close contact with and presses one side surface of the disc, thereby generating the braking force.

The pistons respectively disposed in the plurality of cylinder grooves 113 and 114 simultaneously press the adjacent pad plates 310 against the disc. The friction pads 320 respectively attached to the pair of pad plates 310 simultaneously come into close contact with the two opposite surfaces of the disc, thereby generating the braking force.

When the hydraulic pressure applied to the cylinder grooves 113 and 114 is eliminated, the pistons are moved (retracted) away from the disc, and the pad plates 310 are returned to the original positions by the elastic forces provided by the pad springs 400. The friction pads 320 are spaced apart from the disc.

The disc brake according to the embodiment of the present disclosure includes the cylinder body 100, and the cylinder body 100 may be a cylinder body of a fixed caliper. In contrast, unlike the fixed caliper in the related art, the disc brake according to the embodiment of the present disclosure does not require a pin, and thus the disc brake does not require a pin fixing clip. Therefore, it is not necessary to form a pin fixing hole in the cylinder body 100.

Unlike the cylinder body of the fixed caliper in the related art, the cylinder body 100 of the disc brake according to the embodiment of the present disclosure is not fixed to the knuckle of the vehicle body, but the bracket 200 of the bracket assembly is fixed to the knuckle.

The disc brake according to the embodiment of the present disclosure adopts the separate bracket 200, thereby simplifying the process of manufacturing the cylinder body 100 and eliminating the restriction on the process of manufacturing the cylinder body 100.

A captive structure is applied to the bracket 200 of the disc brake according to the embodiment of the present disclosure, such that the pin, the pin fixing hole, and the pin fixing clip, which are required for the fixed caliper in the related art, are not required. Therefore, it is possible to reduce the number of components and product costs.

The captive structure refers to a structure in which the protruding portions formed at the two opposite ends of each of the pair of pad plates 310 are inserted into the guide grooves 223, 233, 263, and 273 of the bracket 200 and may move (forward or rearward) along the guide grooves 223, 233, 263, and 273.

According to the disc brake according to the embodiment of the present disclosure, only the bracket 200 may be changed without changing the cylinder body 100 when a vehicle mounting dimension is changed. Therefore, the cylinder body 100 may be used in common.

The features, structures, effects, and the like described above in the exemplary embodiments are included in at least one exemplary embodiment of the present disclosure, but the present disclosure is not necessarily limited to one exemplary embodiment. Furthermore, the features, structures, effects, and the like described in the respective embodiments may be combined or modified and then carried out by those skilled in the art as other embodiments. It should be interpreted that the combination and modification are included in the scope of the present disclosure.

The embodiments have been described above, but the embodiments are just illustrative and not intended to limit the present disclosure. It can be appreciated by those skilled in the art that various modifications and alterations, which are not described above, may be made without departing from the intrinsic features of the present disclosure. That is, the respective constituent elements specifically described in the exemplary embodiments may be modified and then carried out. Further, it should be interpreted that the differences related to the modifications and alterations are included in the scope of the present disclosure defined by the appended claims.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A disc brake comprising:
   a cylinder body; and
   a bracket assembly disposed in a space in the cylinder body,
   wherein the cylinder body and the bracket assembly are fastened to each other by fastening members,
   the bracket assembly comprises a bracket and a pad structure,
      the pad structure comprises one pad structure and an other pad structure seated on the bracket,
      the bracket comprises:
         a support portion fixed to a vehicle body;
         a first seating portion connected to the support portion, wherein the one pad structure is seated on the first seating portion and configured to be movable forward or rearward;
         a second seating portion, wherein the other pad structure is seated on the second seating portion and configured to be movable forward or rearward; and
         a connection portion, wherein one end of the connection portion is connected to the first seating portion and an other end of the connection portion is connected to the second seating portion, and
   wherein the one pad structure and the other pad structure are spaced apart from each other by the connection portion and a disc, which rotates together with a wheel, is positioned between the one pad structure and the other pad structure.

2. The disc brake of claim 1, wherein the bracket has a plurality of fastening holes, and the plurality of fastening holes is formed in a lateral surface of the cylinder body so that the bracket assembly is fastened to the cylinder body, and
   wherein one end of the fastening member penetrates the fastening hole of the cylinder body and is inserted into and fixed to the fastening hole of the bracket.

3. The disc brake of claim 2, wherein the first seating portion comprises first and second catching portions connected to the support portion, the first and second catching portions extend from two opposite ends of the support portion, based on the longitudinal direction, in a direction vertically perpendicular to the longitudinal direction of the support portion, and the one pad structure is seated between the first and second catching portions.

4. The disc brake of claim 3, wherein a pad plate of the one pad structure is configured to slide along first and second guide grooves respectively formed in the first and second catching portions.

5. The disc brake of claim 4, wherein the first catching portion comprises:
   a first guide groove having a concave groove shape; and a first guide projection stepped with respect to the first guide groove, and wherein the second catching portion comprises:
a second guide groove having a concave groove shape; and
a second guide projection stepped with respect to the second guide groove.

6. The disc brake of claim 5, wherein the shapes of the first and second guide grooves correspond to shapes of protruding portions formed at an end of the pad plate.

7. The disc brake of claim 2, wherein the second seating portion comprises third and fourth catching portions connected to the connection portion, and the other pad structure is seated between the third and fourth catching portions.

8. The disc brake of claim 7, wherein a pad plate of the other pad structure is configured to slide along third and fourth guide grooves respectively formed in the third and fourth catching portions.

9. The disc brake of claim 8, wherein the third catching portion comprises:
a third guide groove having a concave groove shape; and
a third guide projection stepped with respect to the third guide groove, and
wherein the fourth catching portion comprises:
a fourth guide groove having a concave groove shape; and
a fourth guide projection stepped with respect to the fourth guide groove.

10. The disc brake of claim 9, wherein the shapes of the third and fourth guide grooves correspond to shapes of protruding portions formed at an end of the pad plate.

11. The disc brake of claim 2, wherein the connection portion comprises first and second connection portions connected to the first seating portion, the second seating portion comprises third and fourth catching portions connected to the connection portion, one end of the third catching portion is connected to the other end of the first connection portion, one end of the fourth catching portion is connected to the other end of the second connection portion, the third catching portion extends downward from the other end of the first connection portion in a direction vertically perpendicular to a longitudinal direction of the support portion, and the fourth catching portion extends downward from the other end of the second connection portion in the direction vertically perpendicular to the longitudinal direction of the support portion.

12. The disc brake of claim 11, wherein one of the plurality of fastening holes is provided at the other end of the third catching portion and formed in a direction horizontally perpendicular to the longitudinal direction of the support portion, and another of the plurality of fastening holes is provided at the other end of the fourth catching portion and formed in the direction horizontally perpendicular to the longitudinal direction of the support portion.

13. The disc brake of claim 1, wherein the bracket assembly comprises a pair of pad springs,
wherein each of the pair of pad springs comprises:
an upper close-contact portion; and
first and second extension portions respectively extending downward from two opposite sides of the upper close-contact portion, and
wherein each of the first and second extension portions sequentially comprises:
a coupling portion;
a guide portion connected to the coupling portion;
a lateral support portion connected to the guide portion and configured to support a lateral surface of a pad plate; and
a lower end support portion connected to the lateral support portion and configured to support a lower end of the pad plate.

14. The disc brake of claim 13, wherein the guide portion of each of the first and second extension portions is connected to a guide groove formed in a catching portion of a bracket and curved so that a protruding portion of the pad plate is fitted with the guide portion.

15. The disc brake of claim 2, wherein the pad structure comprises a pad plate and a friction pad attached to one surface of the pad plate.

16. The disc brake of claim 15, wherein the bracket assembly comprises a piston assembly disposed in a cylinder groove of the cylinder body.

17. The disc brake of claim 2, wherein fixing holes are formed at two opposite ends of the support portion based on a longitudinal direction, and fastening means fix the bracket to vehicle body by being fastened to a knuckle of the vehicle body while penetrating the fixing holes.

18. The disc brake of claim 2, wherein the first seating portion comprises first and second catching portions connected to the support portion, the connection portion comprises first and second connection portions connected to the first seating portion, one end of the first connection portion is connected to the first catching portion, one end of the second connection portion is connected to the second catching portion, the first connection portion extends from an end of the first catching portion in a direction horizontally perpendicular to a longitudinal direction of the support portion, and the second connection portion extends from an end of the second catching portion in the direction horizontally perpendicular to the longitudinal direction of the support portion.

* * * * *